United States Patent [19]

Tranovich

[11] Patent Number: 5,568,022
[45] Date of Patent: Oct. 22, 1996

[54] INTEGRATED COMPLIANCE SERVOVALVE

[75] Inventor: Stephen J. Tranovich, Valencia, Calif.

[73] Assignee: HR Textron Inc., Valencia, Calif.

[21] Appl. No.: 543,567

[22] Filed: Oct. 16, 1995

Related U.S. Application Data

[62] Division of Ser. No. 308,713, Sep. 19, 1994, Pat. No. 5,500,580.

[51] Int. Cl.⁶ ........................................................ F15B 9/09
[52] U.S. Cl. .................... 318/566; 318/645; 251/129.11; 446/330
[58] Field of Search ................................. 318/560, 561, 318/566, 568.11, 568.16, 568.17, 611, 621, 622, 623, 645, 652; 251/129.01, 129.11, 129.12; 446/268, 330

[56] References Cited

U.S. PATENT DOCUMENTS 3,958,492  5/1976  Curless .
4,513,782  4/1985  Contartese et al. .
4,628,499  12/1986  Hammett .
5,012,722  5/1991  McCormick .
5,249,117  9/1993  Greenough et al. .

Primary Examiner—Bentsu Ro
Attorney, Agent, or Firm—Robbins, Berliner & Carson, LLP

[57]  ABSTRACT

An integrated compliance electrohydraulic servovalve system connected to a load such as a simulated living being to provide more realistic movement thereto. The system includes a pressure transducer for sensing the pressure appearing at the output of the electrohydraulic servovalve and which is applied to an actuator connected to the load. The pressure as sensed is developed into a corresponding electrical signal which is used as a feed back signal to the drive motor of the electrohydraulic servovalve. The actuator position signal is also provided and is summed with the position command input signal to provide the command signal which is also summed with the pressure signal prior to application to the drive motor. The utilization of the pressure feed back signal provides compliance to the over all system resulting in a realistic movement of the simulated living being.

8 Claims, 5 Drawing Sheets

INTEGRATED COMPLIANCE SERVOVALVE

This application is a division of application Ser. No. 08/308,713, filed Sep. 19, 1994, now U.S. Pat. No. 5,500,580, issued Mar. 19, 1996.

BACKGROUND OF THE INVENTION

A. Field of the Invention

The present invention relates generally to electrohydraulic servovalves and more particularly to such valves which include improved feedback loops which provide higher rates of motion of a load to a commanded position and at the same time provide damping to cushion forces which are applied to the load. Although not limited thereto the electrohydraulic servovalve of the present invention is particularly useful in the field of animatronics. The field of animatronics is the simulation of living beings by various combinations of mechanical, electrical and hydraulic means.

DESCRIPTION OF THE PRIOR ART

Various control systems for manipulator type apparatus have been proposed and/or implemented utilizing servo loops having command signals and feedback signals to position a particular apparatus such as a manipulator arm on a robotic device or the like. Such devices are utilized for various types of work such as the positioning of a work-piece into a receiving device or the like.

The term "compliance" as used throughout the specification and claims is defined to mean the use of a low-authority force-related feedback term in addition to the traditional position feedback in an actuator loop. The force feedback is generally such that forces or inertial loads applied to the system cause the opening of a hydraulic valve which tends to cushion such forces (rather than opposing them) while the position loop is simultaneously opposing them to achieve or maintain the commanded position. Such compliance is particularly useful in animatronics. The purposes of compliance in such animatronics applications are to allow higher rates of motion with high inertia moves (such as a shoulder driving an extended arm) without destroying the figure's structure with the inertial loads due to sudden starts and stops; to provide dynamic damping which avoids the "bounce" appearance of an under damped move; and to provide a more natural look to the overall animated character where other unconnected moves in the same structure (such as the elbow) react to accelerations and decelerations without specific position commands to do so. The overall objective in animatronics is for the figure's movement to look as natural as possible.

The prior art known to applicant which utilizes the term compliance therein typically deals only with reducing the apparent stiffness of a hydraulically or electromechanically driven device to an externally applied force. This is normally done to allow such apparatus, such as robot manipulators, to do mechanical assembly work which requires reduced stiffness to allow for variation in work-piece and positional placement. If such is not done then an extremely stiff servo system will force the work-piece into the receiving device and if the two are not exactly aligned the work-piece may be damaged. A typical example of such a structure is illustrated in U.S. Pat. No. 5,206,930 to Ishakawa et al. In this structure compliance control is in response to externally applied forces and is achieved through force feedback fed into a control algorythym. The control system allows the mechanical stiffness in any axis to be specified as a commanded input. It should be noted that this and other such manipulator systems, for example, that as illustrated in U.S. Pat. No. 4,792,715 to Barsky are directed to stiffness resulting from externally applied forces and not to inertial stiffness. The Barsky patent is furthermore directed to controlling force only rather than primarily controlling position with a force feedback component.

Compliance as presently known in the prior art animatronics systems is generally accomplished by placing load cells in series with the actuator linkages to provide force feedback signals. Such a structure produces significant mechanical packaging disadvantages in that the space available in the animatronic figure for receiving these structures is usually extremely limited. For example a longer actuator package is required to incorporate the transducer such as the load cell and furthermore there is a significant increase in the wire count for the force transducer leads. In addition to the foregoing, typical current prior art compliant systems have a steady state positional error resulting from a static load being applied to the structure. An example of such a case is where the actuator is required to hold up the weight of a limb or an extended neck or head such as would occur in a dinosaur type animated structure. Usually the animatronic figures of this type are programmed for position with the compliance turned off; this then requires re-tuning of the programming for positional accuracy when the compliance is turned on. Such requires additional expense and if the load is somewhat increased for any particular movement then the result would be an undesirable movement of the figure.

Other prior art known to applicant which relates generally to this field is shown in U.S. Pat. Nos. 4,510,428, 4,164,167, 4,031,813, 4,826,110, 4,598,626, 4,712,470, 5,206,569, 3,763,746, Russian Patent 757777 and Japanese Patent Application No. 2-263127 filed Oct. 2, 1990 entitled Compliance Control Method..

SUMMARY OF THE INVENTION

The present invention provides an electrohydraulic servovalve which includes a spool valve reciprocally disposed within a cylinder bore within a housing and moving responsively to electrical signals applied to a drive motor to control the flow of hydraulic fluid under pressure from a source thereof to a pair of cylinder ports for connecting the fluid to an actuator and ultimately to a load. The servovalve has integrated compliance and includes means for sensing the pressure appearing at the cylinder ports as well as means for sensing the position of the spool valve. In each instance electrical signals are generated proportional to the pressure and position respectively as sensed. Means is provided for coupling each of the feedback signals to the drive motor.

More specifically the present invention also provides a completely integrated subsystem containing all of the components including the servovalve, the force related feedback and the signal conditioning and control electronics necessary to provide the desired compliance.

It is an object of the present invention to provide the integrated subsystem in such a manner as to allow simple incorporation thereof into new animatronic applications with minimal integration required by the user.

It is a further object of the present invention to provide such an integrated package so as to allow retrofit of systems already in existence to provide compliance where only control of actuator position has previously been used.

It is yet a further object of the present invention to provide the integrated subsystem in such a manner that the command signal interface to a servovalve having such compliance can be identical to that for a conventional non-compliant servovalve.

It is yet a further object of the present invention to eliminate the expense and mechanical complication of using load cells in the actuator linkage for force feedback into compliance systems.

It is still a further object of the present invention to provide a unique high performance pressure feedback implementation which has advantages in compliance application for animatronics as well as in general industrial applications.

It is also an additional object of the present invention to provide a compliance system where static positional errors introduced by compliance are minimized.

DETAILED DESCRIPTION

Although it should be understood by those skilled in the art that the present invention is useful in many industrial applications such as robotic manipulators or in other areas where servovalve systems are utilized, the present description will be given with particular emphasis directed to the field of animatronics. In the field of animatronics it is particularly critical, particularly in today's high technology society, that the appearance of life seen by viewers at theme parks, exhibitions, displays and the like is as close to real life as possible. When the exhibit in which the animated figure is used requires rapid movement of a limb of the figure, for example, it is difficult for the figure programmer to achieve the required acceleration of the moving limb without suddenly stopping at the required end position; with an attendant unnatural jerkiness in the appearance of the move caused by the inertia of the moving limb combined with the spring effects from the hydraulic and mechanical structures. Although a natural appearance can be achieved by very careful programming of accelerations and decelerations, elimination of the "bouncing" or "jerky" appearance without specific commands by the programmer is of great benefit to the user in the ease and efficacy of achieving natural appearance. Even more difficult to program are the reactions of the remaining moves in the figure to sudden accelerations and decelerations of individual moves. To achieve this effect (which occurs naturally in all living beings), the programmer is required to estimate the inertial effects of the move in a real being and input slight positional commands to the unconnected moves to achieve these effects. A much more natural-looking movement can be achieved by a system which reacts to the inertia in unconnected moves directly, without requiring such effort on the part of the programmer. The utilization of the integrated compliance of the present invention substantially eliminates the jerkiness of rapid moves without great effort on the part of the programmer and furthermore allows unconnected moves to respond to inertial effects with no programmer input.

Figure 1:
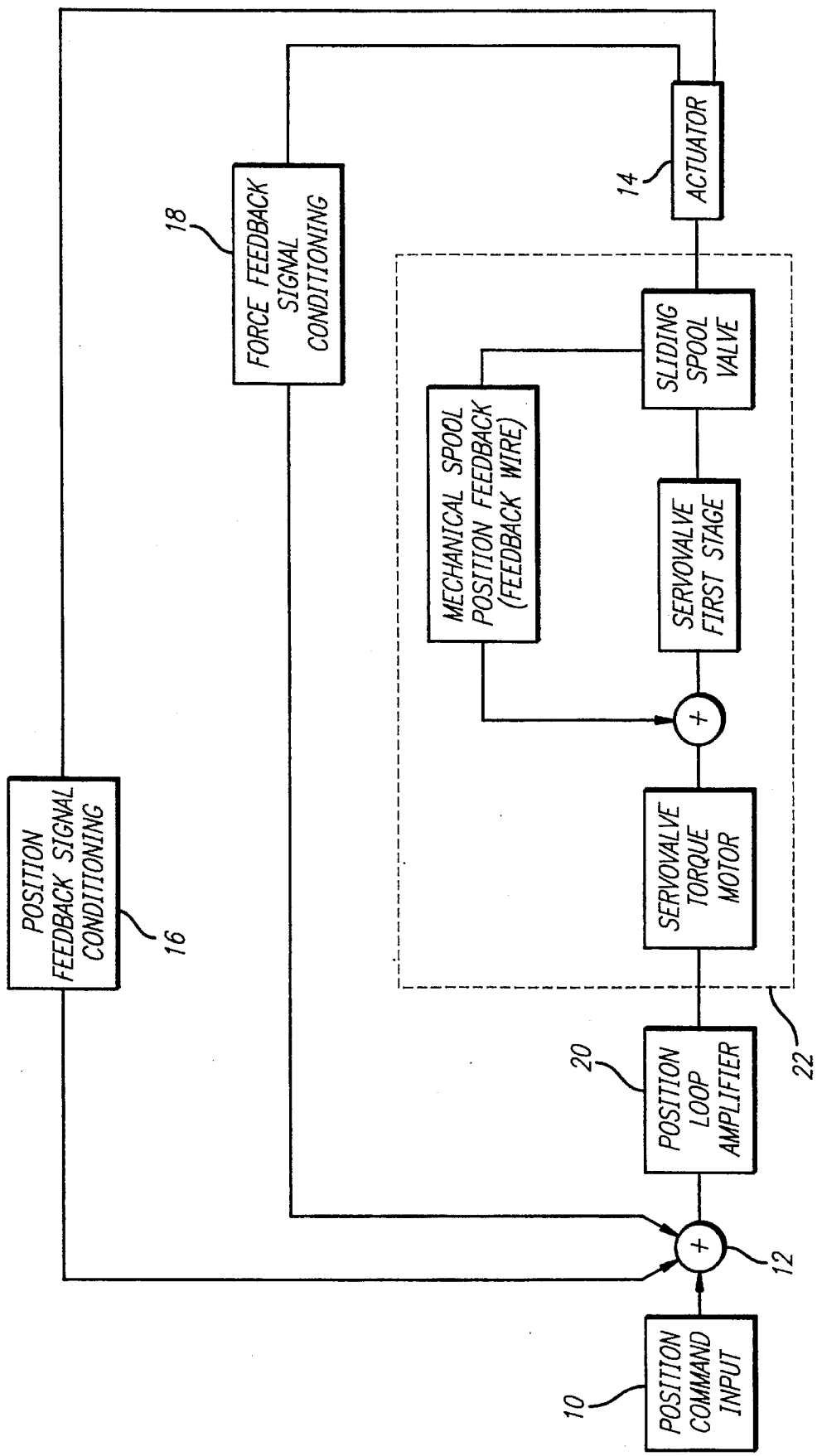
FIG. 1 is a block diagram showing a conventional flow control servovalve having an outer loop for force feedback as is known in the prior art; p

Typical prior art systems are of the type as shown in FIG. 1 to which reference is hereby made. As is therein shown a position command signal is provided from a position command input 10 to a summing point 12. Also supplied to the summing point 12 is a position feedback signal taken from the actuator 14 and conditioned by the position feedback signal conditioning 16. In addition a force feedback signal generated by load cells connected in series with and also taken from the actuator 14 and conditioned by force feedback signal conditioning circuit 18 is connected to the summing junction 12. The output from the summing junction 12 is applied to an amplifier 20 which then provides a signal to the servovalve 22. As is well known to those skilled in the art, the typical servovalve includes first and second stages with a mechanical feedback between the second stage and the torque motor or the first stage. Typically the feedback would be in the form of a feedback wire mechanically interconnected between the spool valve and the torque motor.

A structure of the type illustrated in FIG. 1 will typically utilize load cells in series with the actuator 14 to provide the force feedback signal which is then conditioned by the signal conditioning circuit 18. Typically the position feedback signal for the actuator 14 will be provided by a Linear Variable Differential Transformer (LVDT), a linear potentiometer, a rotary potentiometer, or a Rotary Variable Differential Transformer (RVDT) depending upon the particular type of actuator and the application involved. The position signal may be operated upon or conditioned as required for any application. It should be noted by those skilled in the art that the force feedback and position feedback signals are both incorporated into the outer position feedback loop and summed with the command signal.

The circuit as shown in FIG. 1 will produce a steady state positional error when a static load is applied to the actuator. That is, if the load which is connected to the actuator is constant in the absence of a command signal from the position command input 10 a steady state positional error will occur thereby causing improper movement of the limb, head, tail or other such structure of the simulated living being. As a result, if compliance such as that shown in FIG. 1 is applied to a structure, then programming of the position command input must be redone to restore positional accuracy thereby causing additional complications, costs and maintenance problems.

Figure 2:
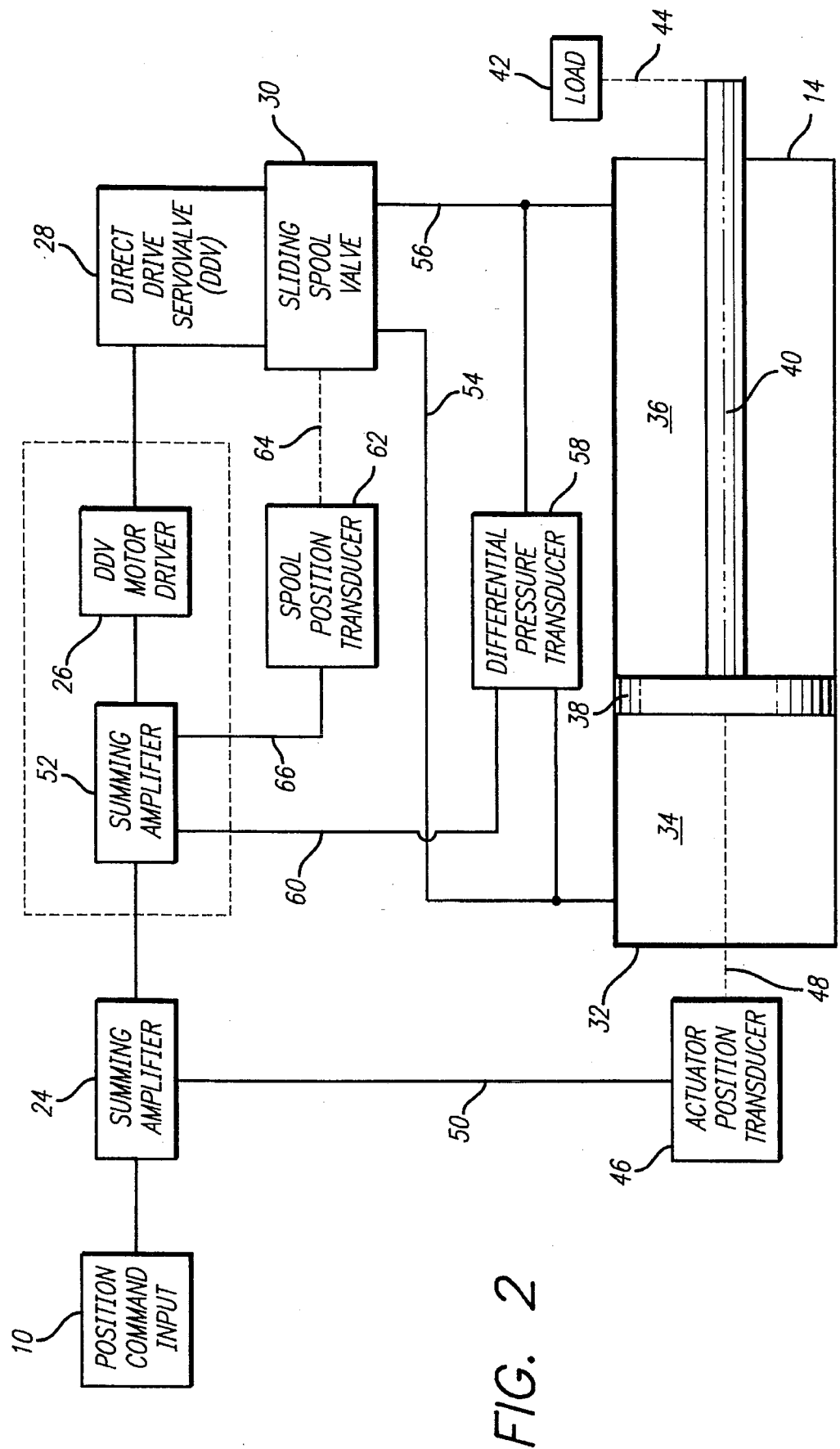
FIG. 2 is a schematic diagram illustrating an electrohydraulic servovalve having feedback in accordance with the principles of the present invention.

By referring now more particularly to FIG. 2 there is illustrated a system including integrated compliance and constructed in accordance with the principles of the present invention. As is shown, a position command input 10 provides a signal to a summing amplifier 24. The position command input may take any form desired, but typically will be the output electrical signals generated by a computer program which has been provided to cause the particular simulated living being to move in accordance with a predetermined pattern. This pattern may, from time-to-time be changed by reprogramming the computer or alternatively if interactive response is required the signals may be changed during the performance involving the simulated living being. As the position command input signals are generated, they are summed with appropriate feedback signals and applied to a direct drive valve (DDV) motor driver 26 and from there to a direct drive servovalve motor 28. The direct drive servovalve motor 28 is mechanically directly coupled to a sliding spool valve 30 which controls the flow of hydraulic fluid under pressure from a source thereof (not shown) to an actuator 14. Together, the direct drive servovalve motor and the sliding spool valve comprise a direct drive servovalve. As is well known to those skilled in the art, the actuator 14 includes a cylinder 32 which is divided into a pair of cylinder chambers 34 and 36 by a piston 38. The piston 38 has a piston rod 40 connected thereto which protrudes through the cylinder 32 and in turn is connected to a load 42 as is shown by the dashed line 44. Thus, movement of the piston 38 causes the load to take various positions as commanded by the computer program or other type of input signals generated by the position command input 10.

It is important to know the position of the load at any point in time which will be proportional to the position of the piston 38. Such is accomplished by providing a position transducer 46 which may, as above indicated, take the form of an LVDT. The position transducers 46 is connected as shown by the dashed line 48 to the piston 38. The position transducer 46 generates an electrical signal which is proportional to the position of the piston 38 and which is applied over the lead 50 to the summing amplifier 24. As known to those skilled in the art, the difference between the output signal from the position command input and the signal from the position transducer provides the signal which is applied to the summing amplifier 52 which in turn provides the drive signal to the motor driver 26.

In accordance with the principles of the present invention, a feedback signal proportional to the applied force is provided by sensing the pressure at the output of the sliding spool valve 30 which can be found in the conduits 54 and 56 connecting the output ports of the sliding spool valve 30 to the chambers 34 and 36 respectively of the cylinder 32. This pressure may be sensed by differential pressure transducer 58 which provides an output electrical signal over the lead 60 as an input to the summing amplifier 52. Alternatively, the pressure may be sensed by individual pressure transducers in conduits 54 and 56 and the outputs of these summed electronically to provide the differential pressure to line 60. The output signal from the differential pressure transducer 58 is proportional to the difference in the pressure of the cylinders 34 and 36. This pressure difference may represent a difference in the pressure of the fluid being provided as a result of signals applied to the direct drive servovalve or alternatively may be proportional to forces applied by the load 42 to the piston rod 40. In either event an electrical signal is provided which is proportional to the differential pressure appearing at the output ports of the sliding spool valve 30.

It should also be noted that there is provided a spool position feedback apparatus 62 which is connected as shown by the line 64 to the sliding spool valve 30. This spool position feedback 62 may take the form of an LVDT which develops an electrical signal which is applied over the lead 66 as an input to the summing amplifier 52. Alternatively, the direct drive servovalve spool position may be sensed by a transducer such as a potentiometer or Hall Effect device incorporated into the direct drive servovalve motor 28.

By consideration of the structure as shown in block diagram schematic form in FIG. 2, it will be recognized by those skilled in the art that the force feedback signal in the form of a differential pressure is directly incorporated into the electrical position loop for the spool 30 of the direct drive servovalve 28 rather than into the actuator position loop which has been the case in the prior art and as shown in FIG. 1. In one implementation of the structure as shown in FIG. 2 the differential pressure transducer 58 may take the form of a piezo-electric crystal. Such a piezo electric crystal provides an output signal on the lead 60 only when the pressure between the conduits 54 and 56 is changing. Since such is the case, no signal will be provided on the lead 60 when the pressure is static. This, therefore eliminates the presence of a static position error of the type discussed earlier.

It will be recognized by those skilled in the art that the structure as shown in FIG. 2 provides an apparatus wherein the authority of the compliance (pressure) feedback is completely independent of the actuator position loop gain. Such a structure allows adjustment of the relatively low actuator loop gains preferred by those working in the field of animatronics without interfering with the operation of the compliance feedback system. Also it will be noted that the compliance feedback is in a high frequency response loop (as compared to the actuator loop) which allows control of the more sudden accelerations than in the relatively slow actuator position loop.

Figure 4:
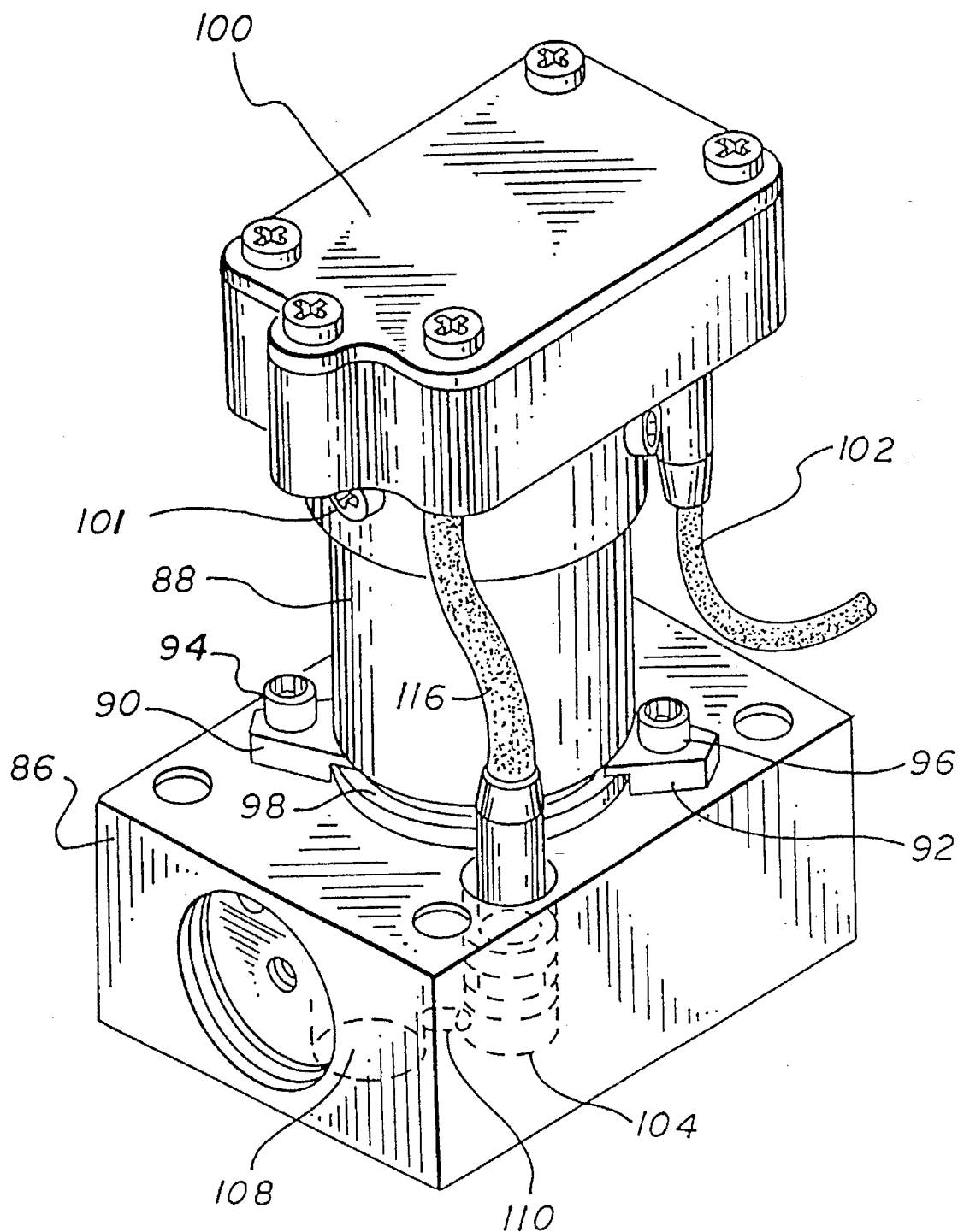
FIG. 4 is a schematic perspective view of an integrated direct drive servovalve having compliance and constructed in accordance with the principles of the present invention.
Figure 5:
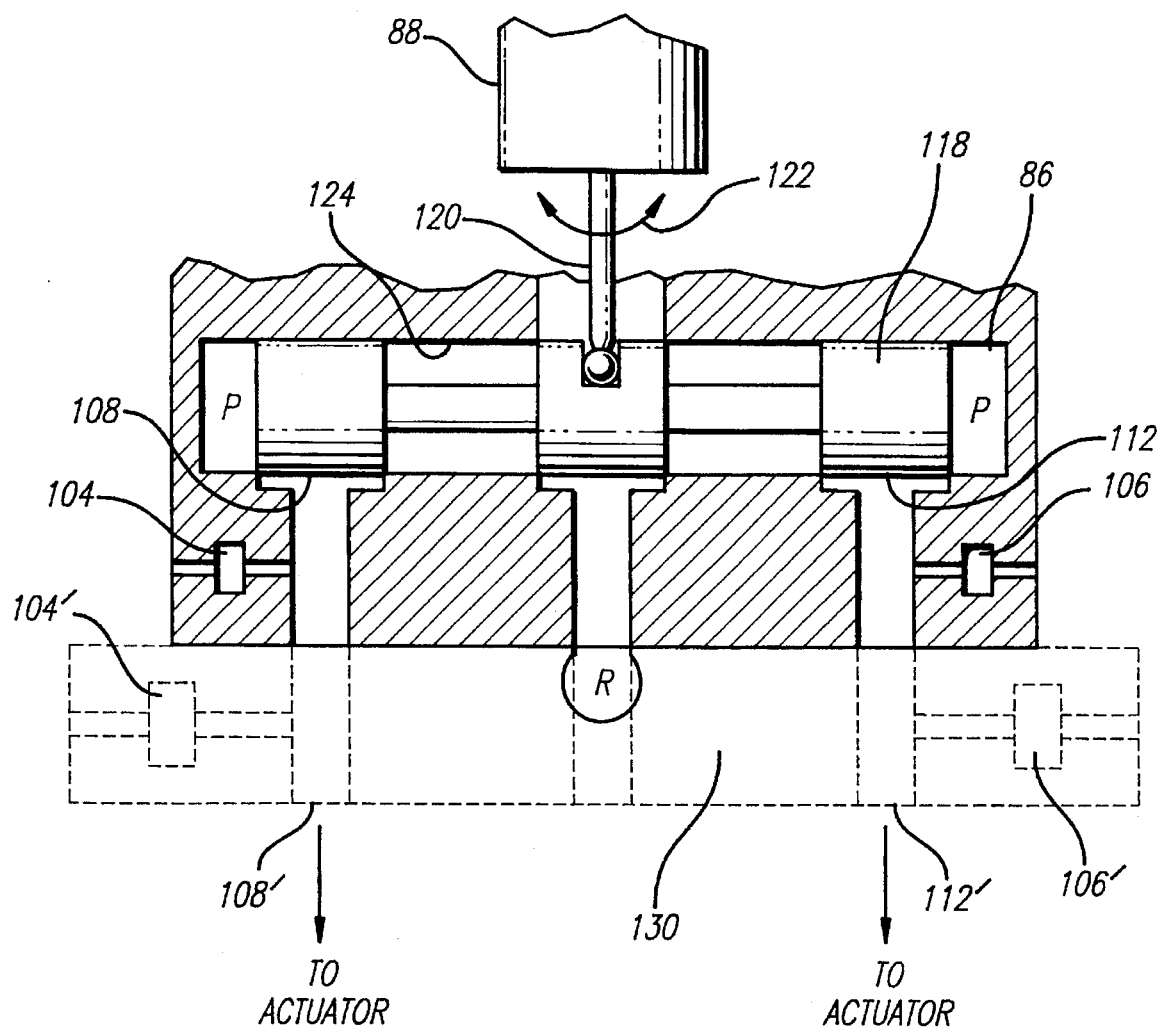
FIG. 5 is a partial cross-sectional diagram illustrating placement and connection of pressure transducers in accordance with the present invention.

A servovalve of the type as shown in FIG. 2 and as will be more fully disclosed in conjunction with the description of the structures shown in FIGS. 4 and 5 provides a completely integrated subsystem containing all of the components necessary to incorporate compliance into relatively unsophisticated systems. Such systems in the past utilized only control of actuator position in order to provide the animatronic motion desired. The command signal interface to such a servovalve can be identical to that for a conventional servovalve which provides no compliance function such as those described in the prior art.

Where the pressure transducer 58 is of the piezo-electric type and thus reacts only to changing pressure signals no steady state positional error results from the retrofitting of the integrated compliance servovalve into an existing position control loop. Under, these conditions, the original programming of the animatronic figure can be used without the necessity of returning when compliance is added.

Those skilled in the art will recognize that the use of pressure feedback in hydraulic servo systems for damping stabilization and force control is well known. Examples of prior art structures incorporating such pressure feedback are illustrated in U.S. Pat. Nos. 4,031,813 Walters et al.; 4,164, 167 Imai et al.; 4,510,428 Dunne; 4,712,470 Schmitz and 5,154,207 Bolt. The most pertinent of these prior art references is the patent to Dunne. This patent discloses a control system for a manipulator arm incorporating indirect pressure feedback for inertial scaling and direct pressure feedback to represent the acceleration term. This patent is directed to the inertial scaling concept where the differential pressure is sensed so as to determined the dynamic inertia of the manipulator arm. The scaling is then applied to the acceleration command so as to dynamically modify the loop gain and thus optimize the loop gain for any manipulator inertia condition. The direct pressure feedback is used to close the acceleration command loop and also provides the additional benefit providing damping for the velocity command loop. It should be noted by those skilled in the art that there are no velocity or acceleration command loops in the compliance system in accordance with the present invention. Further, it should also be noted that the structure-as disclosed by Dunne does not address the compliance aspect of pressure feedback.

Also of interest is the disclosure as shown in Imai et al., this patent discloses a hydraulic servo mechanism in which pressure feedback is used to eliminate shocks in a hydraulic system for a vibration test system. However, the shocks are defined as distortions appearing in acceleration wave forms taken at the output of the test equipment and due to non-linearities of the servovalve. The system used to address this completely non-related problem is substantially different from the system as disclosed in the present invention.

Figure 3:
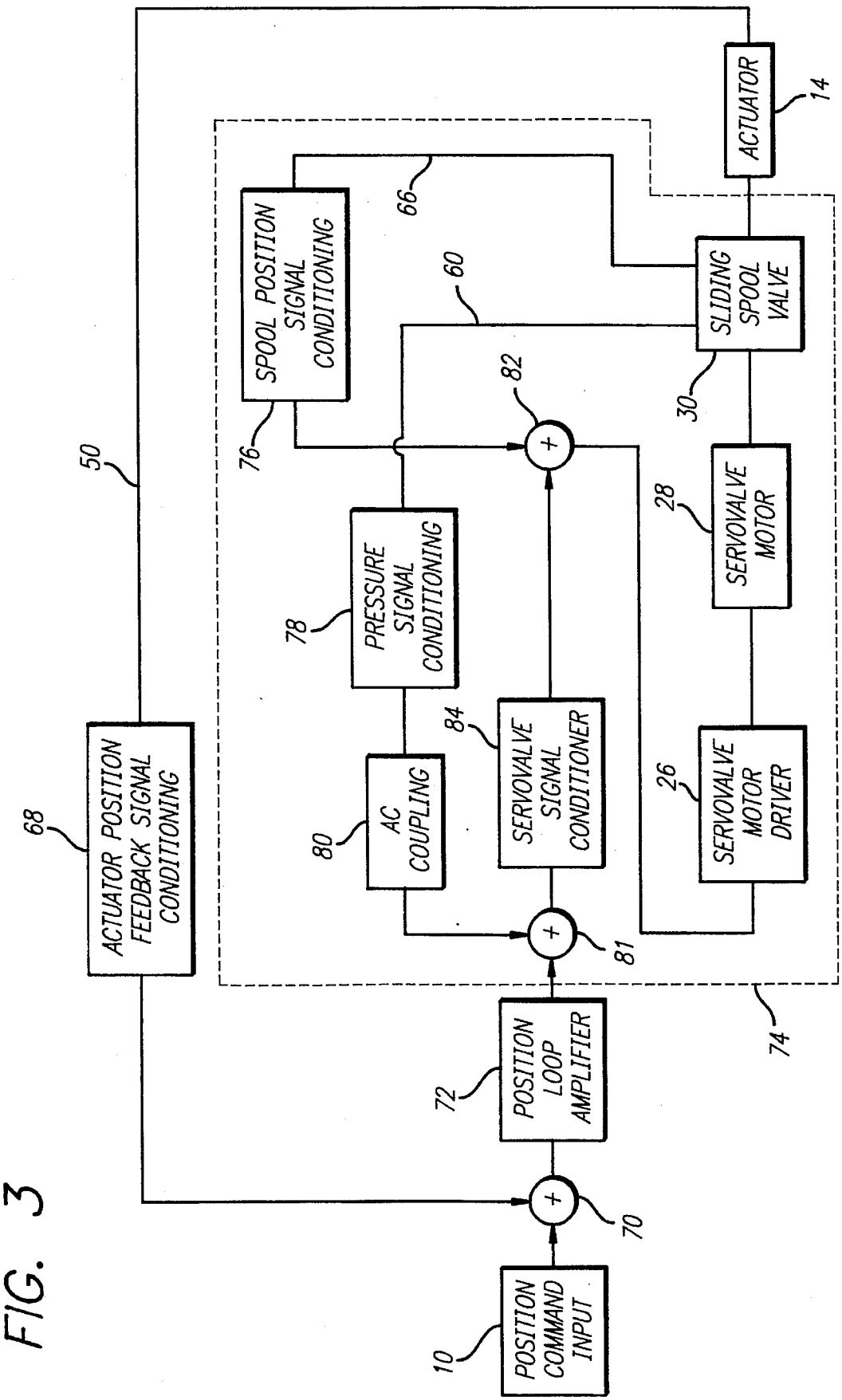
FIG. 3 is a block diagram similar to that of FIG. 1 but illustrating the direct drive servovalve with integrated compliance constructed in accordance with the principles of the present invention.

Referring now more particularly to FIG. 3 there is illustrated a schematic diagram of a system constructed in accordance with the present invention wherein the elements required for effecting the desired compliance are incorporated into a completely integrated subsystem. As is shown in FIG. 3, the position command input 10 provides a signal to the summing point 70. In addition, the position signal from the actuator position transducer is provided over the lead 50 to an actuator position feedback signal conditioning circuit 68 and it in turn also provides an input to the summing junction 70. The output signal from the summing junction 70 is provided to a position loop amplifier 72. The position loop amplifier then provides an input signal to the integrated compliance system 74 of the present invention. The integrated compliance system includes some of the same elements as disclosed in FIG. 2 and the same reference numerals are used herein with respect thereto. As is shown in FIG. 3, the spool position transducer signal from the sliding spool valve 30 is applied over the lead 66 to a spool position signal conditioning circuit 76, the output of which is applied as an input to a summing junction 82. In addition the differential pressure signal which appears on the lead 60 is applied to a pressure signal conditioning circuit 78 which in turn is applied to an AC coupling network 80 and the output of that coupling network is applied as an input to the summing junction 81. The pressure signal conditioning is typically a circuit which receives the individual signals from separate pressure transducers and converts them into a pressure differential signal. Such circuits are well known in the prior art and may for example include one or more bridge circuits providing input signals to an operational amplifier. The A-C coupling 80 may be any AC coupling scheme desired and for example may include a low pass filter for blocking high frequency noise followed by a typical resistor-capacitor (R-C) coupling circuit for passing only dynamic signals while blocking steady state signals.

The output from the position loop amplifier 72 is applied as an input signal to the summing junction 81. The output of the summing junction 81 is applied as an input signal to the servovalve signal conditioner 84 the output of which in turn is also applied as an input signal to the summing junction 82. The output of the summing junction 82 in turn is applied to the servovalve motor driver 26 and in turn to the servovalve motor 28 which positions the sliding spool valve 30. As indicated above in conjunction with FIG. 2 in accordance with the preferred embodiment of the present invention the servovalve driver motor and sliding spool valve are interconnected in the form of a direct drive servovalve.

It will be seen from a consideration of the schematic as shown in FIG. 3 that the pressure feedback signal and spool position signal along with the appropriate signal conditioning circuits may all be integrated into a single system as shown within the dashed line 74. This structure may be provided as part of an overall system, including the actuator and the position command input. However, the integrated system as shown within the dashed lines 74 may also be provided as a plug in type of unit usable to retrofit existing systems to thereby provide compliance in accordance with the principles of the present invention, but without disturbing the outer loop feedback and position commands already in place to provide movement of the desired animatronic figure.

By reference now more particularly to FIG. 4 there is illustrated a typical direct drive servovalve with integrated compliance as constructed in accordance with the principles of the present invention. As is therein shown, there is provided a housing 86 upon which there is mounted a direct drive servovalve motor 88. As is noted, the motor may be held in place upon the housing by appropriate clamps 90 and 92 which are held in place with appropriate fasteners 94 and 96. The clamps 90 and 92 fit within a groove 98 which provide for adjustment of the motor 88 and the direct drive mechanism extending therefrom into engagement with the spool. An integrated electronics package 100 is held in placed upon the top of the motor 88 by appropriate fasteners such as a bolt or the like 101. An electrical conduit or lead 102 provides appropriate command input signals to the electronics package 100. In the following discussion, note that there are two pressure transducer structures as described. For clarity of illustration, only one is shown in FIG. 4. An identical structure associated with the other cylinder port is hidden by the servovalve motor 88 in the illustration. Disposed internally of the housing 86 are first and second pressure transducers one of which is shown at 104. The pressure transducer 104 is in communication with the control port 108 by way of the passageway 110. The other pressure transducer (not shown) is similarly in communication with the other control port (not shown) by way of a passageway (not shown). The separate pressure transducers provide an inexpensive way of generating an electrical signal which is proportional to the differential pressure appearing at the control ports 108 and 112 which is in essence, the same as the pressure appearing in the chambers 34 and 36 of the actuator 14 as shown in FIG. 2. The electrical signals thus generated are provided over the electrical leads 116 and 117 (not shown) to the integrated electronics package 100.

It should be noted that the structure as shown in FIG. 4, and as more clearly illustrated in FIG. 5 to which reference is hereby made, incorporates the pressure transducers 104 and 106 directly within the structure of the housing 86 wherein the spool valve 118 is reciprocally disposed. As is more clearly shown in FIG. 5 upon application of a signal to the motor 88 a drive shaft 120 rotates in a limited angular manner as shown by the arrow 122 to directly reciprocate the spool valve 118 within the cylinder 124 in the housing 86. Depending upon the direction of movement, fluid from the source P flows through one or the other of the ports 108 and 112 to the actuator while return R is connected to the other.

It has been found that under certain circumstances the housing 86 may be so small as to be unable to accept the transducers directly therein. Under such circumstances there may be provided a separate manifold as shown in dashed lines 130 in FIG. 5. This manifold has the control ports 108 and 112 extended by, direct conduits passing through the manifold 130. The pressure transducers as shown at 104' and 106' are disposed within the manifold 130 and are connected directly to the extensions of the control ports 108 and 112 as shown at 108' and 112'. The electrical signals generated by the transducers are then provided as above described to the integrated electronics package where the differential pressure is measured electronically and an appropriate signal is generated representative of that differential pressure in order to provide the desired pressure feedback signal to accomplish the compliance in accordance with the principles of the present invention.

Applicant recognizes that the prior art patent to Bolt discloses a differential pressure transducer positioned within a housing attached either directly to a pneumatic servovalve or, alternatively, is housed within a separate transducer housing with connections between it and the servovalve and the actuator. This mechanization is distinguishable from that disclosed in accordance with the present invention and as shown in FIGS. 4 and 5, because individual pressure transducers are used for each cylinder port and the transducers are directly fastened to or inserted into the servovalve or, alternatively, into the manifold, rather than being incorporated into a separate transducer housing. In addition to the foregoing, in accordance with the preferred embodiment of the present invention, the fluid source is hydraulic fluid under pressure rather than being pneumatic.

There has been thus disclosed an integrated compliance servovalve which has particular application in the field of animatronics wherein the pressure feedback signal is incorporated into the electrical position loop for the spool of a direct drive servovalve rather than into the actuator position loop. This pressure feedback signal is therefore summed with the velocity of the actuator (which is proportional to the servovalve spool position) rather than the position of the actuator. Such a structure therefore provides the desired integrated compliance signal which is completely independent of the actuator position loop gain and is used in the higher frequency response loop therefore allowing better control of the more sudden accelerations than has previously been available.

What is claimed is:

1. A compliance system for use in providing a natural appearance to the movements of simulated living beings by dynamically altering the apparent stiffness of the system by providing a feedback signal which is proportional to forces applied by and to an actuator but which is completely independent of the actuator position feedback loop gain, said system comprising:

an electrohydraulic servovalve including a drive motor for controlling the position of a spool valve to control the flow of fluid from a source thereof;

a source of command signals coupled to said electrohydraulic servovalve for commanding at least a portion of said simulated living being to move;

an actuator including a piston coupled between said electrohydraulic servovalve and said at least one portion of said simulated living being to receive said fluid from said electrohydraulic servovalve to impart said commanded motion to said being;

means for continuously sensing the pressure appearing on each side of said piston and providing a first electrical feedback signal proportional thereto; and means for coupling said first electrical feedback signal to said drive motor.

2. A compliance system as defined in claim 1 which further includes means for generating a second feedback signal representative of the position of said piston; first means for summing said second feedback signal with said command signal to develop a difference signal for application to said electrohydraulic servovalve; and second means for summing, said difference signal and said first feedback signal being applied to said second summing means.

3. A compliance system as defined in claim 2 wherein said first feedback signal is proportional to the differential pressure across said piston.

4. A compliance system as defined in claim 3 wherein said electrohydraulic servovalve is a direct drive valve.

5. A compliance system as defined in claim 1 which further includes:

means for providing a third electrical feedback signal representative of the position of said spool valve;

means for summing said first and third electrical feedback signals to provide a resultant spool valve position feedback electrical signal; and means for applying said resultant spool valve position feedback electrical signal to said drive motor, said means for coupling said first electrical feedback signal includes said means for summing.

6. A compliance system as defined in claim 5 which further includes means for generating a second feedback signal representative of the position of said piston; first means for summing said second feedback signal with said command signal to develop a difference signal for application to said electrohydraulic servovalve; and second means for summing, said difference signal and said first feedback signal being applied to said second summing means.

7. A compliance system as defined in claim 6 wherein said first feedback signal is proportional to the differential pressure across said piston.

8. A compliance system as defined in claim 7 wherein said electrohydraulic servovalve is a direct drive valve.

* * * * *